(12) United States Patent
Fraley (10) Patent No.: US 8,526,931 B1
(45) Date of Patent: Sep. 3, 2013

(54) WIRELESS NETWORK-CONTROLLED ENABLING OF USER DEVICE TRANSCEIVER

(75) Inventor: William Fraley, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 146 days.

(21) Appl. No.: 13/211,083

(22) Filed: Aug. 16, 2011

(51) Int. Cl.
*H04M 3/00* (2006.01)
*H04B 7/00* (2006.01)
*H04W 4/00* (2009.01)

(52) U.S. Cl.
USPC .............. 455/418; 455/432.1; 455/435.1; 370/310.2; 370/328; 370/338

(58) Field of Classification Search
USPC ............ 455/404.2, 418–422.1, 432.1–444, 455/456.1–457, 41.2, 550.1, 552.1, 553.1, 455/556.1, 556.2, 557, 127.4, 151.2; 370/310.2, 370/328, 331–334, 338, 351–356
See application file for complete search history.

(56) References Cited

U.S. PATENT DOCUMENTS

| | | | |
|---|---|---|---|
| 5,722,072 A | 2/1998 | Crichton et al. | |
| 5,857,112 A | 1/1999 | Hashemi et al. | |
| 7,502,624 B2 * | 3/2009 | Rasanen | 455/552.1 |
| 7,532,596 B2 | 5/2009 | Trossen et al. | |
| 2004/0147262 A1 | 7/2004 | Lescuyer et al. | |
| 2004/0170122 A1 * | 9/2004 | Guo et al. | 370/210 |
| 2005/0047412 A1 | 3/2005 | Hares | |
| 2005/0070288 A1 | 3/2005 | Belkin et al. | |
| 2005/0250468 A1 * | 11/2005 | Lu et al. | 455/403 |
| 2006/0270447 A1 | 11/2006 | Everson et al. | |
| 2007/0042777 A1 * | 2/2007 | Govindarajan et al. | 455/435.2 |
| 2007/0060123 A1 | 3/2007 | Maes | |
| 2008/0025263 A1 | 1/2008 | Pelkonen | |
| 2009/0221294 A1 | 9/2009 | Breuer et al. | |
| 2009/0262690 A1 | 10/2009 | Breuer et al. | |
| 2009/0318136 A1 | 12/2009 | Dillinger et al. | |
| 2010/0027505 A1 | 2/2010 | Breuer et al. | |
| 2010/0113020 A1 * | 5/2010 | Subramanian et al. | 455/435.2 |
| 2011/0189997 A1 * | 8/2011 | Tiwari et al. | 455/443 |
| 2011/0286437 A1 * | 11/2011 | Austin et al. | 370/338 |
| 2011/0310787 A1 * | 12/2011 | Sheriff et al. | 370/315 |
| 2012/0003976 A1 * | 1/2012 | Bhat et al. | 455/436 |
| 2012/0033654 A1 * | 2/2012 | Kalbag | 370/338 |
| 2012/0214494 A1 * | 8/2012 | Awoniyi et al. | 455/439 |

OTHER PUBLICATIONS

Kibria et. al, "A Location Aware Three-Step Vertical Handoff Scheme for 4G/B3G Networks", 2005, IEEE GLOBECOMM.*
U.S. Appl. No. 11/747,517, filed May 11, 2007

(Continued)

*Primary Examiner* — San Htun (57) ABSTRACT

A method of operating a wireless communication system is disclosed. The method includes exchanging first wireless communication signals with a user device over a first wireless communication network to provide a communication service, where the user device has a selection mode for a second wireless communication network that a user may set to one of: on, off, and automatic. If the network selection mode in the user device is set to automatic, then processing location information for the user device to determine potential service quality from the second wireless communication network for the user device, and if the potential service quality is higher than a threshold, then wirelessly transferring a control signal to the user device over the first wireless communication network, where the control signal drives the user device to automatically enable a wireless transceiver for the second wireless communication network.

16 Claims, 6 Drawing Sheets

(56) References Cited

OTHER PUBLICATIONS

USPTO Office Action Summary mailed Jul. 21, 2009 in U.S. Appl. No. 11/277,241.

Aaditeshwar Seth, et al.; "Opportunistic Data Transfer Over Heterogeneous Wireless Networks;" Feb. 2, 2005; 26 pages; Sprint Advanced Technology Laboratory; Burlingame, California, U.S.A.

A. Seth, et al.; "Application Support for Opportunistic Communication on Multiple Wireless Networks;" 14 pages; School of Computer Science, University of Waterloo, Ontario, Canada; Sprint Advanced Technology Labs, Burlingame, California, U.S.A.

* cited by examiner

WIRELESS NETWORK-CONTROLLED ENABLING OF USER DEVICE TRANSCEIVER

TECHNICAL FIELD

Aspects of the disclosure are related to the field of communications, and in particular, wireless network-controlled enabling of wireless communication transceivers in user devices for communicating over different wireless communication networks.

TECHNICAL BACKGROUND

Wireless communication systems typically include wireless access nodes distributed across a geographic area to provide wireless access to communication services for user devices. Typically, the user devices are mobile communication devices, and allow a user to move about a geographic area, receiving wireless access from nearby wireless access nodes. Wireless communication systems can also include multiple wireless communication networks, namely wireless communication networks which communicate over different wireless protocols, wireless standards, or frequency spectrum, and using different wireless access nodes. For example, the various wireless communication networks could include third-generation (3G) or fourth generation (4G) cellular voice and data networks, or could include wireless local-area or personal-area networks.

However, when a user device includes transceivers for more than one wireless communication network, switching between the various networks can lead to decreased levels of service if a newly selected network has poor signal quality for a particular location.

Additionally, the user device often does not know of potential service quality before selecting another wireless communication network.

OVERVIEW

A method of operating a wireless communication system is disclosed. The method includes exchanging first wireless communication signals with a user device over a first wireless communication network to provide a communication service, where the user device has a selection mode for a second wireless communication network that a user may set to one of: on, off, and automatic. The method also includes wirelessly receiving a status signal from the user device over the first wireless communication network indicating if the network selection mode for the second wireless communication network is set to automatic. If the network selection mode in the user device is set to automatic, then processing location information for the user device to determine potential service quality from the second wireless communication network for the user device, and if the potential service quality is higher than a threshold, then wirelessly transferring a control signal to the user device over the first wireless communication network, where the control signal drives the user device to automatically enable a wireless transceiver for the second wireless communication network. The method also includes exchanging second wireless communication signals with the user device over the second wireless communication network to provide the communication service.

A wireless communication system is also disclosed. The wireless communication system includes a first wireless communication network configured to exchange first wireless communication signals with a user device over the first wireless communication network to provide a communication service, where the user device has a selection mode for a second wireless communication network that a user may set to one of: on, off, and automatic. The first wireless communication network is configured to wirelessly receive a status signal from the user device over the first wireless communication network indicating if the network selection mode for the second wireless communication network is set to automatic. If the network selection mode in the user device is set to automatic, then the first wireless communication network is configured to process location information for the user device to determine potential service quality from the second wireless communication network for the user device, and if the potential service quality is higher than a threshold, then the first wireless communication network is configured to wirelessly transfer a control signal to the user device over the first wireless communication network, where the control signal drives the user device to automatically enable a wireless transceiver for the second wireless communication network. The second wireless communication network is configured to exchange second wireless communication signals with the user device over the second wireless communication network to provide the communication service.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
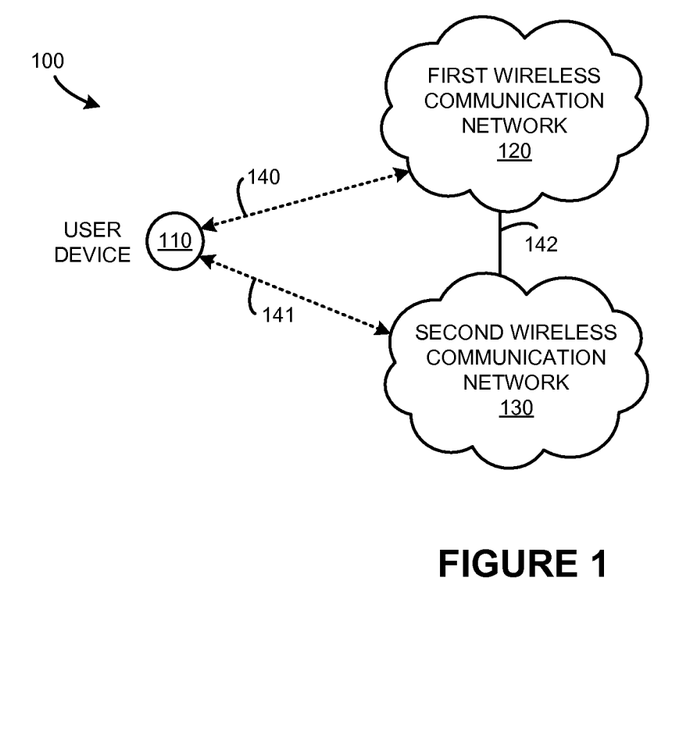
FIG. 1 is a system diagram illustrating a communication system.

FIG. 1 is a system diagram illustrating communication system 100. Communication system 100 includes user device 110, first wireless communication network 120, and second wireless communication network 130. User device 110 and first wireless communication network 120 communicate over wireless link 140. User device 110 and second wireless communication network 130 communicate over wireless link 141. First wireless communication network 120 and second wireless communication network 130 communicate over link 142. In FIG. 1, first wireless communication network 120 initially provides wireless access over link 140 to communication services for user device 110. Second wireless communication network 130 can also provide wireless access over link 141 to communication services for user device 110, although initially user device 110 is not receiving wireless access from second wireless communication network 130.

Figure 2:
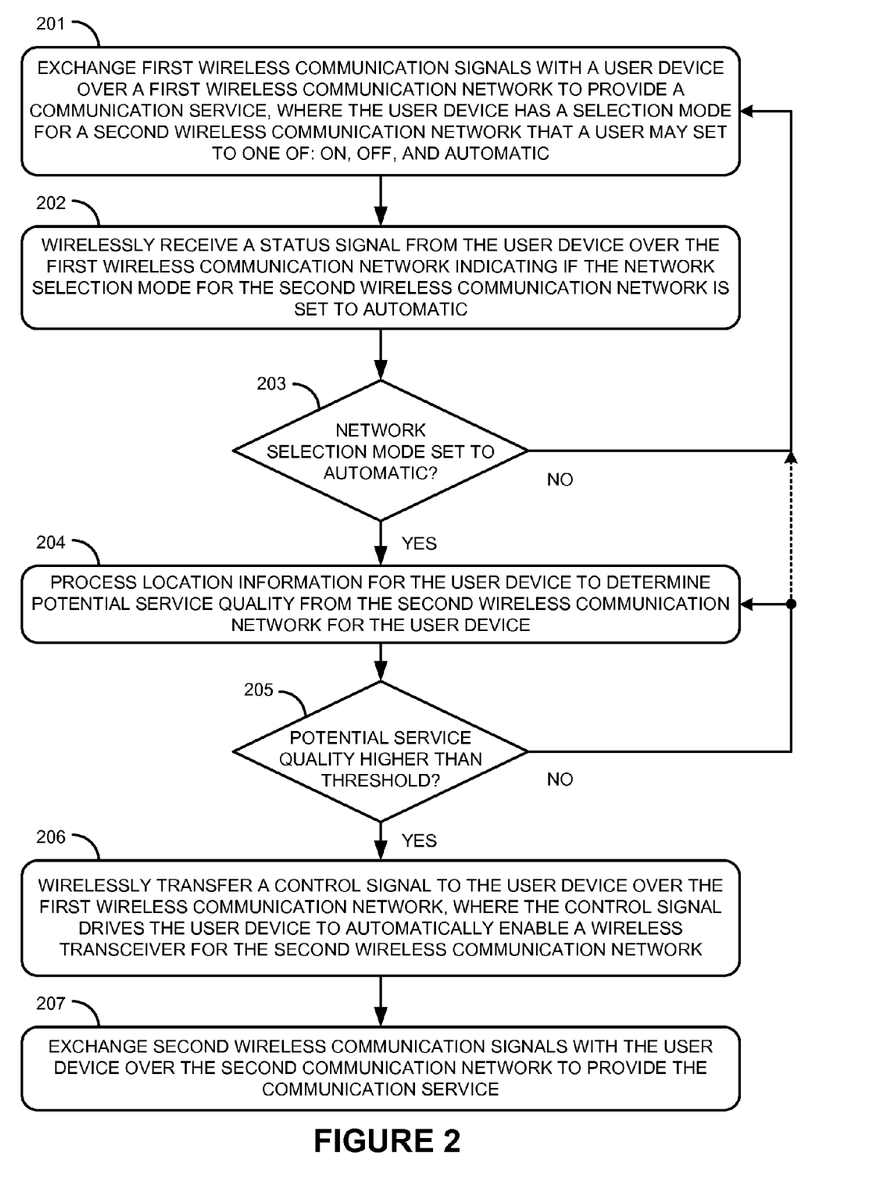
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, first wireless communication network 120 exchanges (201) first wireless communication signals with user device 110 over first wireless communication network 120 to provide a communication service, where user device 110 has a selection mode for second wireless communication network 130 that a user may set to one of: on, off, and automatic. The first wireless communication signals are associated with a communication service for user device 110, such as a voice call, data exchange, text message, or other communication service, where the communication signals are exchanged over wireless link 140. The selection mode for second wireless communication network 130 enables a transceiver portion of user device 110 which can communicate over wireless link 141 with second wireless communication network 130. The selection mode could include enabling the transceiver portion in the 'on' mode, disabling the transceiver portion in the 'off' mode, and placing the transceiver portion into an automatic selection mode in the 'automatic' mode. The automatic mode allows user device 110 to be driven by a received control signal or control instruction to enable the transceiver portion used for communicating with second wireless communication network 130.

First wireless communication network 120 wirelessly receives (202) a status signal from user device 110 over first wireless communication network 120 indicating if the network selection mode for the second wireless communication network 130 is set to automatic. The status signal could include a bit or number of bits indicating the network selection mode of user device 110. The status signal could indicate the network selection mode among the various modes, or only indicate if user device 110 is set to the automatic mode. The status signal could be included in the wireless communication signals during the communications service, such as within user communications, or could be included in overhead communications.

If the network selection mode is not set to automatic (203), the first wireless communication network 120 continues to monitor for changes in the status signal. However, if the network selection mode is set to automatic (203), then first wireless communication network 120 processes (204) location information for user device 110 to determine potential service quality from second wireless communication network 130 for user device 110. The location information includes information on the location of user device 110, as well as information on the location of user device 110 within second wireless communication network 130. In typical examples, second wireless communication network 130 includes many wireless access nodes distributed across a geographic area, such as a city, state, or other region. The location of user device 110 could be determined by location determining equipment of first wireless communication network 120. The location of user device 110 could instead be determined by user device 110, such as by receiving and processing global positioning system (GPS) signals to determine a geographic location. User device 110 could transfer the location of user device 110 to first wireless communication system 110 concurrent with the status signal.

Once the location of user device 110 is identified, potential service quality for user device 110 from second wireless communication network 130 could be determined. To determine the potential service quality, first wireless communication network 120 could identify estimated or measured signal quality information for second wireless communication network 130 and determine the potential service quality for user device 110 based on the signal quality information and the geographic location of user device 110. In some examples, no service is available for user devices from second wireless communication network 130 near the location of user device 110, and the potential service quality for user device 110 would be non-existent. However, in this example, some potential service is available for user device 110 from second wireless communication network 130.

If the potential service quality is less than a threshold (205), then first wireless communication network 120 does not transfer a control signal to user device 110 regarding second wireless communication network 130, and user device 110 continues to receive wireless access from first wireless communication network 120. However, if the potential service quality is higher than the threshold (205), then first wireless communication network 120 wirelessly transfers (206) a control signal to user device 110 over first wireless communication network 120, where the control signal drives user device 110 to automatically enable a wireless transceiver for second wireless communication network 130. The service quality threshold could indicate a minimum level of potential service quality for user device 110 must be reached before transferring the control signal, such as a signal level threshold, a data rate threshold, or other thresholds indicating acceptable potential service quality. The control signal indicates to user device 110 that the potential service quality from second wireless communication network 130 exceeds the threshold, and drives user device 110 to switch to communicating over second wireless communication network 130 instead of first wireless communication network 120. The control signal could include an instruction for user device 110 to enable a transceiver portion associated with second wireless communication network 130. In some examples, user device 110 can determine if the control signal is followed, or if the control signal is ignored. In other examples, once user device 110 is set to the automatic mode, then first wireless communication network 120 maintains control over the enablement of the transceiver portion associated with second wireless communication network 130, and the control instruction is not ignored by user device 110. In response to the control signal, user device 110 could enable the transceiver portion discussed above, and initiate communications over wireless link 141 with second wireless communication network 130. The response time from when user device 110 receives the control signal until when further action is taken could be variable, such as immediately, occurring during a subsequent handoff, or after a predetermined period of time. The desired response time could be included in the control instruction.

Second wireless communication network 130 exchanges (207) second wireless communication signals with user device 110 over second wireless communication network 130 to provide the communication service. Once the wireless transceiver of user device 110 is enabled in response to the control signal, then a communication session is initiated between second wireless communication network 130 and user device 110. User device 110 and second wireless communication network 130 exchange second wireless communication signals over wireless link 141 to provide the communication service, which could include voice calls, data exchange, text messages, or other communication services. In some examples, the same communication service or communication session is maintained during the switchover from first wireless communication network 120 to second wireless communication network 130.

Figure 3:
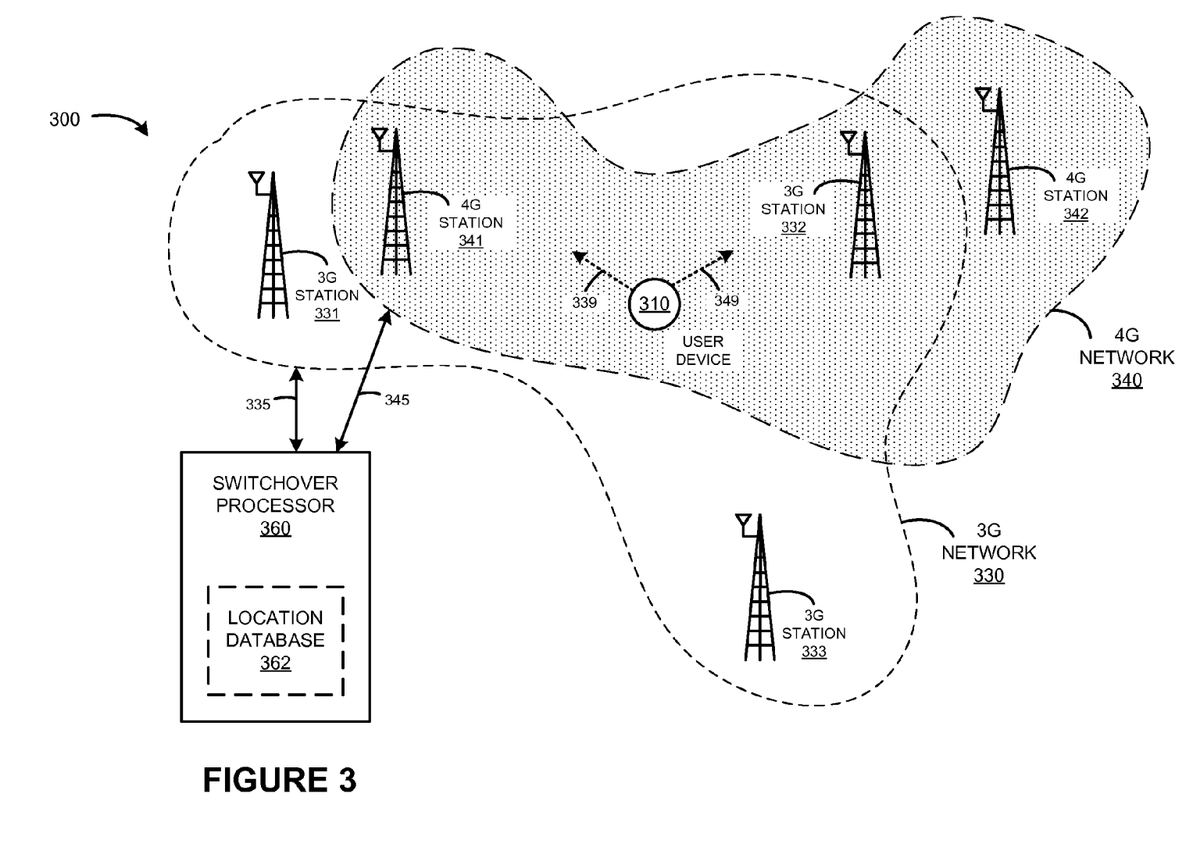
FIG. 3 is a system diagram illustrating a communication system.

FIG. 3 is a system diagram illustrating communication system 300. Communication system 300 includes user device 310, third-generation (3G) wireless network 330, 3G base stations 331-333, fourth-generation (4G) wireless network 340, 4G base stations 341-342, and switchover processor 360. 3G network 330 and switchover processor 360 communicate over IP link 335. 4G network 340 and switchover processor 360 communicate over IP link 345. User device 310 and 3G network 330 communicate over 3G wireless link 339. User device 310 and 4G network 340 communicate over 4G wireless link 349.

As shown in FIG. 3, 3G wireless network 330 includes base stations 331-333 distributed over a geographic area, such as a city. 4G wireless network 340 also includes base stations 341-342 distributed over the same geographic area, although at different locations than base stations 331-333. The approximate wireless coverage of each network is illustrated by the enclosed perimeter associated with each network. 3G network 330 uses a third-generation cellular wireless technology and protocol to communicate with user devices, such as CDMA-2000, EV-DO, UTMS, or other third-generation wireless communication standards, including combinations or improvements thereof. 4G network 340 uses a fourth-generation cellular wireless technology and protocol to communicate with user devices, such as WiMAX, LTE, or other fourth-generation wireless communication standards, including combinations or improvements thereof. It should be understood that the wireless networks could be of the same wireless standards, or of other wireless standards, such as Wi-Fi.

In FIG. 3, user device 310 is a dual-mode cellular smartphone capable of communicating over both a 3G and a 4G cellular voice and data network, and includes at least two wireless transceivers for communicating over the various networks. Each base station includes transceivers, antennas, structural support, routers, and processing systems for providing wireless access over wireless links to user devices. It should be understood that each base station communicates with further wireless communication network equipment over backhaul links, which are not shown in FIG. 3 for clarity. Switchover processor 360 includes processing systems, computer-readable media, among other processing and storage elements as discussed herein for processing location information and status signals to determine control signals for driving user devices to enable various transceiver portions thereof. Switchover processor 360 could comprise a computer, server, specialized circuitry, or other computer processing equipment and systems. In FIG. 3, switchover processor 360 optionally includes location database 362. Location database 362 could comprise computer-readable media or computer-readable instructions and data indicating wireless coverage or potential service quality for user devices receiving wireless service from 4G network 340. Location database 362 could comprise wireless coverage maps for 4G network 340, tables of geographic locations associated with potential signal qualities for 4G network 340, geographic locations of base stations of 4G network 340, or other information.

Figure 4:
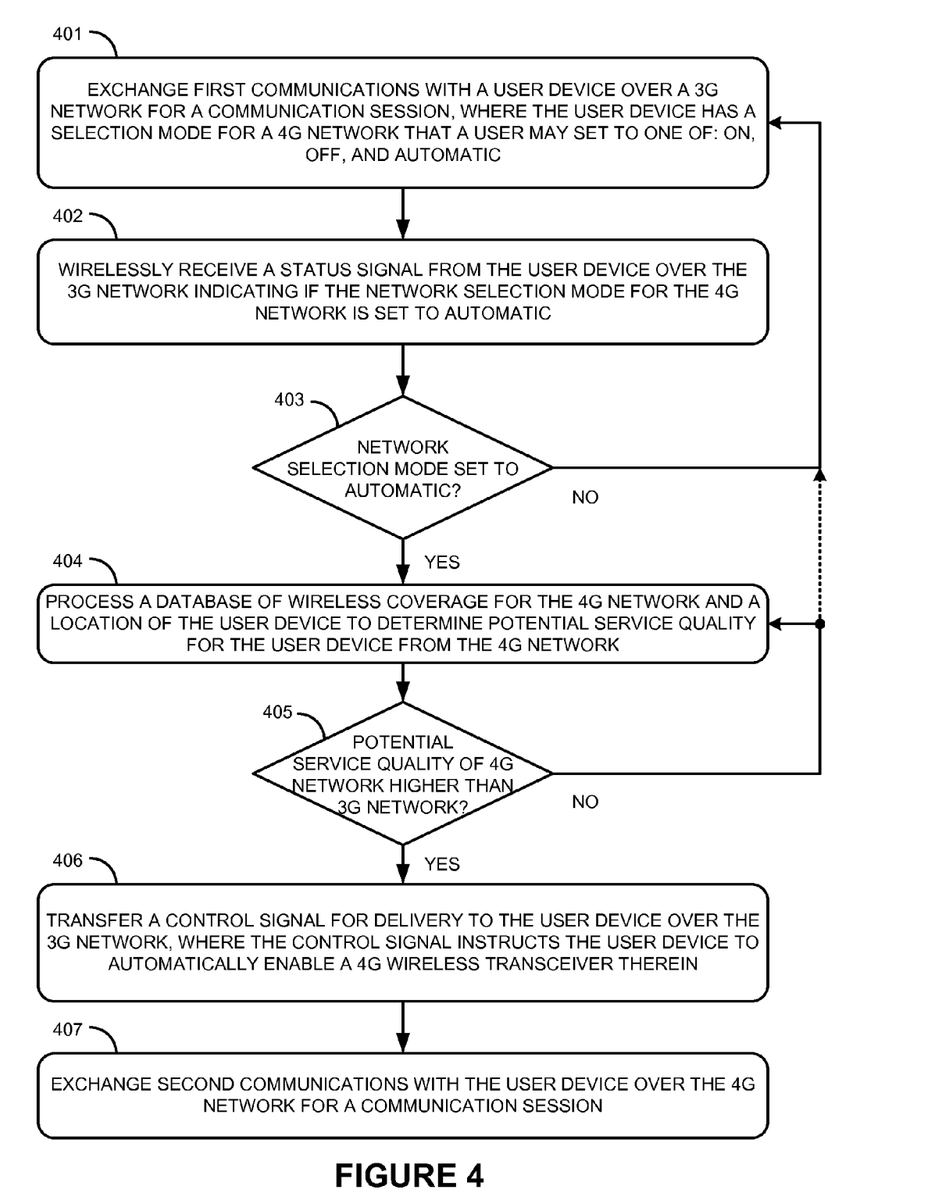
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, 3G network 330 exchanges (401) first communications with user device 310 over 3G network 330 for a communication session, where user device 310 has a selection mode for 4G network 340 that a user may set to one of: on, off, and automatic. Since user device 310 is shown in FIG. 3 as being within the wireless coverage area of 3G network 330, user device 310 could receive wireless access from any of 3G stations 331-333, depending upon proximity, signal quality, position, among other factors. It should be understood that any of 3G stations 331-333 could initially be providing wireless access to user device 310. The 3G wireless access is represented in FIG. 3 as occurring over wireless link 339.

User device 310 includes a selection mode for 4G networks that a user of user device 310 may set to one of either on, off, or automatic. The 'on' mode indicates that a transceiver of user device 310 for 4G networks is on, or in a persistently enabled state, which may include user device 310 communicating over a 4G network, and may also include user device 310 not concurrently communicating over a 3G network. Conversely, the 'off' mode indicates that a transceiver of user device 310 for 4G networks is off, or in a persistently disabled state, which may include user device 310 not communicating over a 4G network, and may also include user device 310 communicating over a 3G network, such as 3G network 330. The 'automatic' mode indicates that a transceiver of user device 310 for 4G networks is to be controlled by a received control signal, such as an external command or instruction received over 3G link 339, as transferred by switchover processor 360.

3G network 330 wirelessly receives (402) a status signal from user device 310 over 3G link 339 indicating if the network selection mode for the 4G network is set to automatic. User device 310 transfers the status signal over 3G link 339 over 3G network 330 for delivery to switchover processor 360. In some examples, the status signal is transferred periodically by user device 310, such as during a repeating overhead communication cycle of 3G link 339. In other examples, the status signal is transferred upon initiation of a new communication session over 3G network 330, or during handoff communications when user device 310 is handing off between ones of 3G stations 331-333. In further examples, switchover processor 360 requests user device 310 transfer the status signal. The status signal could indicate a network selection mode from among the on, off, or automatic modes, or the network selection mode could indicate only if user device 310 is in the automatic mode. The status signal could comprise a data packet, datagram, bit, or other data format, and could be included in other communications, such as user or overhead communications of link 339.

If the network selection mode is not set to automatic (403), then switchover processor 360 continues to receive further status signals from user device 310 and does not transfer control signals to user device 310 for enabling transceiver portions thereof. However, if the network selection mode is set to automatic (403), then switchover processor 360 processes (404) a database of wireless coverage for 4G network 340 and a location of user device 310 to determine potential service quality for user device 310 from 4G network 340. In this example, the database of wireless coverage for 4G network 340 is location database 362. In other examples, switchover processor 360 could access a similar database over links 335 or 345 from systems or equipment of 3G network 330 or 4G network 340. Location database 362 includes information on wireless coverage for 4G network 340, such as wireless coverage areas correlated to geographic coordinates, or potential service quality for various locations or from various 4G base stations. The location of user device 310 could be determined by user device 310, such as via a GPS receiver of user device 310, or the location of user device 310 could be determined by 3G network 330, such as via signal triangulation, signal strength measured by one or more of base stations 331-333, among other location determination methods.

In this example, once the location of user device 310 is determined, switchover processor 360 compares the location of user device 310 against location database 362 to determine a potential service quality of wireless service from 4G network 340 for user device 310. Switchover processor 360 could determine that no service is available for user device 310 from 4G network 340 at the location of user device 310, and user device 310 would thus have no potential service quality from 4G network 340. However, in this example, we assume some potential service is available for user device 310 from 4G network 340. Thus, the location of user device 310 correlates to a potential service quality as indicated in location database 362. Location database 362 could be populated and updated in various ways. In a first example, location database 362 is populated from information received into switchover processor 360 from 4G network 340, possibly periodically or upon a threshold change in service quality as monitored by 4G network 340. In a second example, location database 362 is updated from 4G signal quality determined by 3G network 330, such as measured by each of 3G stations 331-333, among other 3G base stations of 3G network 330.

In further examples, the potential service quality is determined by identifying signal quality information for 4G network 340 in the proximity of user device 310. The signal quality information could include a radio frequency (RF) signal quality for signals transmitted by 4G stations 341-342. The signal quality information could be determined at three or more measurement points of 3G network 330 nearest to the geographic location of user device 310, such as measured at 3G stations 331-333. Measuring signal quality for 4G network 340 at 3G stations 331-333 could comprise including additional receiver or testing equipment at the various base stations of 3G network 330 capable of receiving and detecting signal quality for the communication protocol or frequency spectrum of 4G network 340, which is typically of a different wireless protocol or frequency spectrum than that employed over 3G network 330. Switchover processor 360 could perform a distance weighted averaging of the signal strengths measured for the 4G network, such as the signal strengths measured by each of 3G stations 331-333, and could include further base station measurements in the calculation. In yet further examples, the signal quality information is determined based on service quality or measured signal level of other user devices communicating over 4G network 340 proximate to user device 310. In examples where 4G network 340 determines signal quality information or service quality information, elements of 4G network 340 could transfer this information for delivery to switchover processor over link 345, alternatively, switchover processor 360 could request this information over link 345. Likewise, in examples where 3G network 330 determines signal quality information or service quality information, elements of 3G network 330 could transfer this information for delivery to switchover processor over link 335, alternatively, switchover processor 360 could request this information over link 335.

If the potential service quality of 4G network 340 for user device 310 is lower than the existing service quality of 3G network 330 for user device 310 (405), then switchover processor 360 continues to monitor the potential service quality for user device 310, possibly periodically or after movement of user device 310. However, if the potential service quality of 4G network 340 for user device 310 is higher than the existing service quality of 3G network 330 for user device 310 (405), then switchover processor 360 transfers (406) a control signal for delivery to user device 310 over 3G network 330, where the control signal instructs user device 310 to automatically enable a 4G wireless transceiver therein. In other examples, the existing service quality of 3G network 330 is disregarded, and only the potential service quality of 4G network 340 is considered when determining if the control signal should be transferred.

The control signal is received by user device 310 over link 339, and could be included in user communications or overhead communications of link 339. In some examples, the control signal comprises a command or instruction for user device 310, which could instruct a processor portion of user device 310 to enable a transceiver portion of user device 310, where the transceiver portion is used for communicating with a 4G network. The transceiver portion could further include sub-portions such as a radio, antenna, filters, signal processors, signal interpreters, among other sub-portions. Enabling the transceiver portion could include supplying power to a transceiver portion or sub-portion, sending an enable command to the transceiver portion or sub-portion, or instructing the transceiver portion to initiate a radio link with 4G network 340. The control signal could be transferred in a separate communication session between switchover processor 360 and user device 310. The control instruction could drive user device 310 to switch to communicating over 4G network 340 upon receipt of the control instruction, or could drive user device to switch upon initiation of a handoff between 3G base stations.

4G network 340 then exchanges (407) second communications with user device 310 over 4G network 340 for a communication session. In some examples, the communication session is maintained during the switchover from 3G network 330 to 4G network 340 for user device 310, and the first communications and the second communications are for the same communication session. A common network address, such as an Internet Protocol (IP) address, could be maintained for user device 310 during the switchover in examples where the communication session is maintained. In other examples, the communication session over 3G network 330 is terminated or halted, and a new or related communication session is initiated over 4G network 340 after the switchover. In further examples, the control signal received by user device 310 enables the transceiver portion for 4 G communications and drives user device 310 to initiate a registration process with 4G network 340. In yet further examples, the control signal also drives a 3G transceiver portion of user device 310 to be disabled, possibly upon registration of user device 310 with 4G network 340 or upon initiation of a communication session over 4G network 340. Although in this example 3G and 4G networks have been discussed, it should be understood that different wireless network types could be employed, such as Wi-Fi, Bluetooth, or other wireless networks.

Figure 5:
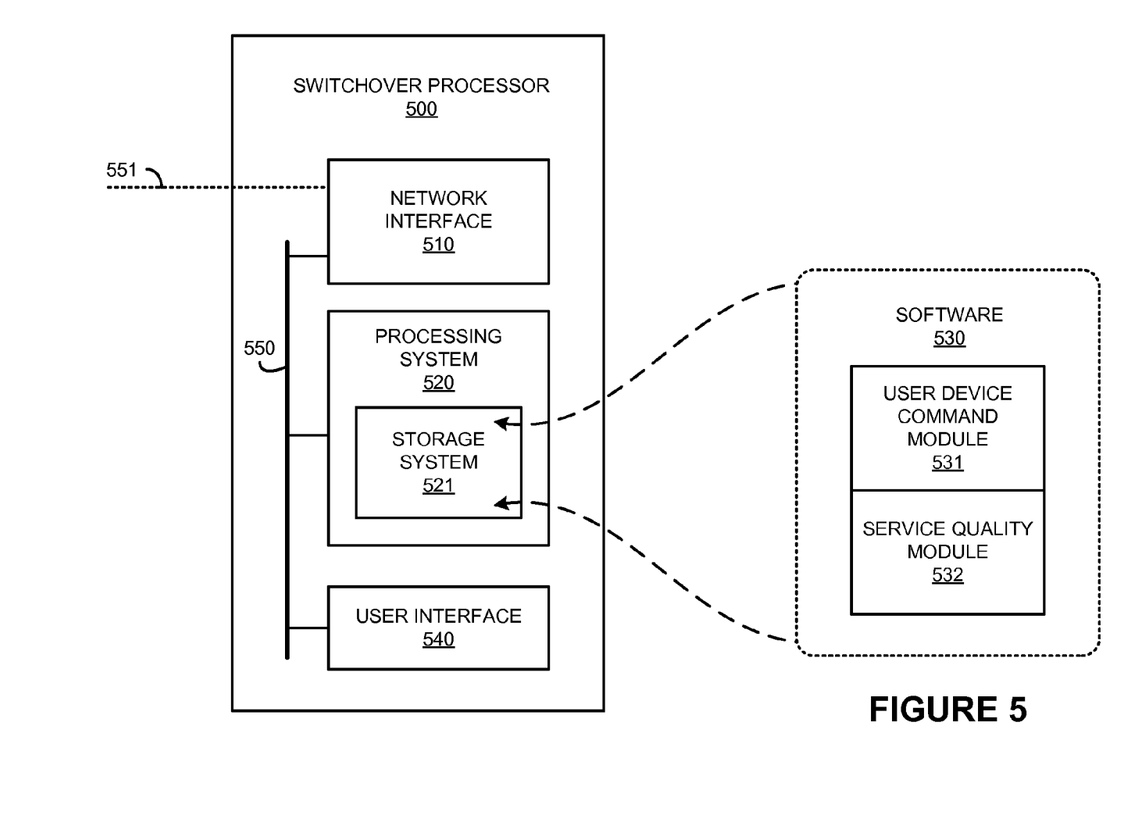
FIG. 5 is a block diagram illustrating a switchover processor.

FIG. 5 is a block diagram illustrating switchover processor 500, as an example of elements of first wireless communication network 120 found in FIG. 1, or switchover processor 360 found in FIG. 3, although wireless communication network 120 or switchover processor 360 could use other configurations. Switchover processor 500 includes network interface 510, processing system 520, and user interface 540. Network interface 510, processing system 520, and user interface 540 are shown to communicate over a common bus 550 for illustrative purposes. It should be understood that discrete links could be employed, such as data links, power links, RF links, or other links. Switchover processor 500 may be distributed among multiple devices that together form the elements of FIG. 5.

Network interface 510 comprises network interface, router, and gateway equipment for communicating with wireless communication provider equipment, such as with wireless communication networks, over the Internet, or other communication systems. Network interface 510 exchanges communications over link 551, such as receiving status signals and location information, as well as transferring control signals. Link 551 could use various protocols or communication formats as described herein for links 142, 335, or 345, including combinations, variations, or improvements thereof.

Processing system 520 includes storage system 521. Processing system 520 retrieves and executes software 530 from storage system 521. In some examples, processing system 520 is located within the same equipment in which network interface 510 or user interface 540 are located. In further examples, processing system 520 comprises specialized circuitry, and software 530 or storage system 521 could be included in the specialized circuitry to operate processing system 520 as described herein. Storage system 521 could include a non-transitory computer-readable medium such as a disk, tape, integrated circuit, server, flash memory, phase change memory, magnetic memory, optical memory, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as receive status signals, process location information and status signals, and determine control signals, among other operations.

In this example, software 530 includes user device command module 531 and service quality module 532. It should be understood that a different configuration could be employed, and individual modules of software 530 could be included in different equipment than switchover processor 500. User device command module 531 determines control instructions for user devices to drive the user devices to enable transceiver portions. User device command module 531 also processes status signals to determine if user devices are in an automatic network selection mode. Service quality module 532 processes locations of user devices and information on potential service quality for user devices to determine if a control instruction or control signal should be transferred. In some examples, service quality module 532 includes a database, or can access a database, indicating wireless coverage or potential service quality for various locations of a wireless communication network.

User interface 540 includes equipment and circuitry for receiving user input and control, such as for setting thresholds or inputting potential signal quality database information, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 540 also includes equipment to communicate information to a user of switchover processor 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof. It should be understood that user interface could comprise a network-based user interface, such as a terminal shell or other maintenance and control interface.

Bus 550 comprises a physical, logical, or virtual communication link, capable of communicating data, control signals, and communications, along with other information. In some examples, bus 550 is encapsulated within the elements of network interface 510, processing system 520, or user interface 540, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks. Bus 550 could be a common link, shared link, or may be comprised of discrete, separate links.

Figure 6:
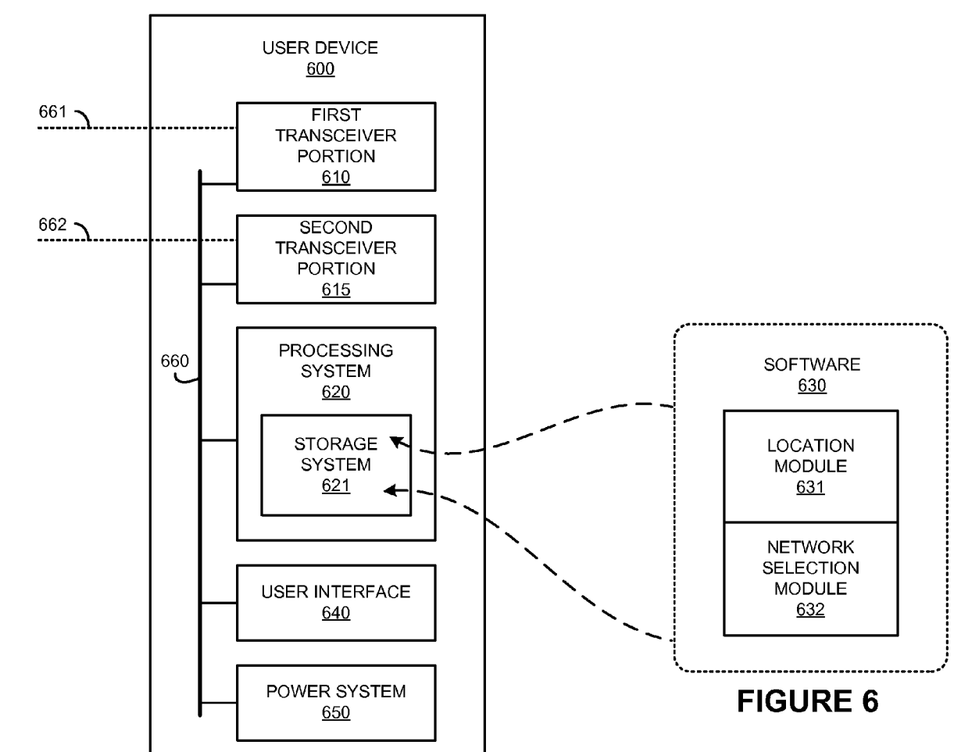
FIG. 6 is a block diagram illustrating a user device.

FIG. 6 is a block diagram illustrating user device 600, as an example of user device 110 found in FIG. 1 or user device 310 found in FIG. 3, although user device 110 or user device 310 could use other configurations. User device 600 includes first transceiver portion 610, second transceiver portion 615, processing system 620, user interface 640, and power system 650. First transceiver portion 610, second transceiver portion 615, processing system 620, user interface 640, and power system 650 are shown to communicate over a common bus 660 for illustrative purposes. It should be understood that discrete links could be employed, such as data links, power links, RF links, or other links. User device 600 may be distributed or consolidated among equipment or circuitry that together forms the elements of user device 600. In further examples, user device 600 includes location determining equipment, such as a GPS receiver to determine a geographic location of user device 600 and communicate the location over bus 660.

First transceiver portion 610 comprises an antenna element and communication interface circuitry for communicating with wireless access nodes of a wireless communication network, such as with base stations of a cellular voice and data network. First transceiver portion 610 could include transceiver equipment and antenna elements for wirelessly exchanging user communications and overhead communications over the associated wireless link 661. First transceiver portion 610 also receives command and control information and instructions from processing system 620 or user interface 640 for controlling the operations of wireless communications over wireless link 661. Wireless link 661 could use various protocols or communication formats as described herein for wireless links 140-141, 339, or 349, including combinations, variations, or improvements thereof. First transceiver portion 610 also can be enabled or disabled, such as entering into powered or unpowered states, by the command of processing system 620 via control signals received over user interface 640, or links 661-662.

Second transceiver portion 615 comprises an antenna element and communication interface circuitry for communicating with wireless access nodes of a wireless communication network, such as with base stations of a cellular voice and data network. Second transceiver portion 615 could include transceiver equipment and antenna elements for wirelessly exchanging user communications and overhead communications over the associated wireless link 662. Second transceiver portion 615 also receives command and control information and instructions from processing system 620 or user interface 640 for controlling the operations of wireless communications over wireless link 662. Wireless link 662 could use various protocols or communication formats as described herein for wireless links 140-141, 339, or 349, including combinations, variations, or improvements thereof. Second transceiver portion 615 also can be enabled or disabled, such as entering into powered or unpowered states, by the command of processing system 620 via control signals received over user interface 640, or links 661-662. In some examples, elements of first transceiver portion 610 and second transceiver portion 615 are included in similar circuitry.

Processing system 620 includes storage system 621. Processing system 620 retrieves and executes software 630 from storage system 621. In some examples, processing system 620 is located within the same equipment in which first transceiver portion 610, second transceiver portion 615, user interface 640, or power system 650 are located. In further examples, processing system 620 comprises specialized circuitry, and software 630 or storage system 621 could be included in the specialized circuitry to operate processing system 620 as described herein. Storage system 621 could include a non-transitory computer-readable medium such as a disk, tape, integrated circuit, server, flash memory, phase change memory, magnetic memory, optical memory, or some other memory device, and also may be distributed among multiple memory devices.

Software 630 may include an operating system, logs, utilities, drivers, networking software, tables, databases, data structures, and other software typically loaded onto a computer system. Software 630 could contain application programs, server software, firmware, or some other form of computer-readable processing instructions. When executed by processing system 620, software 630 directs processing system 620 to operate as described herein, such as determine a location of user device 600, allow a user to choose a network selection mode, and interpret control signals to enable or disable ones of first transceiver portion 610 and second transceiver portion 615, among other operations.

In this example, software 630 includes location module 631 and network selection module 632. It should be understood that a different configuration could be employed, and individual modules of software 630 could be included in different equipment in user device 600. Location module 631 determines a location of user device 600, such as by methods described herein, including GPS positioning, triangulation, inertial positioning, among others. Network selection module 632 receives control signals as received over link 661 or 662, and interprets the signals to enable or disable any of transceiver portions 610-615. Network selection module 632 also allows a user of user device 600 to select a network selection mode between one of on, off, or automatic. Network selection module 632 could communicate with user interface 640 for presenting/receiving a network selection choice to/from a user, such as within graphical user interface elements.

User interface 640 includes equipment and circuitry for receiving user input and control, such as for engaging in voice calls or data sessions, among other operations including allowing a user to select a network selection mode from among on, off, and automatic modes. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface 640 also includes equipment to communicate information to a user of user device 600. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Power system 650 includes circuitry and a power source to provide power to the elements of user device 600. The power source could include a battery, solar cell, spring, flywheel, capacitor, thermoelectric generator, chemical power source, dynamo, or other power source. In some examples, power system 650 receives power from an external source, such as a wall outlet. Power system 650 also includes circuitry to condition, monitor, and distribute electrical power to the elements of user device 600.

Bus 660 comprises a physical, logical, or virtual communication link, capable of communicating data, control signals, and communications, along with other information. In this example, bus 660 also includes RF and power distribution elements, such as wires, circuit board traces, or other elements. In some examples, bus 660 is encapsulated within the elements of first transceiver portion 610, second transceiver portion 615, processing system 620, user interface 640, or power system 650, and may be a software or logical link. In other examples, bus 660 uses various communication media, such as air, space, metal, optical fiber, or some other signal propagation path, including combinations thereof. Bus 660 could be a direct link or might include various equipment, intermediate components, systems, and networks.

Referring back to FIG. 1, user device 110 comprises transceiver circuitry and communication elements. The transceiver circuitry typically includes amplifiers, filters, modulators, and signal processing circuitry. User device 110 may also include user interface systems, memory devices, non-transitory computer-readable storage mediums, software, processing circuitry, or some other communication components. User device 110 may be a user device, wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be included. User device 110 could include multiple transceiver portions or antenna portions, among other circuit and equipment elements, for communicating wirelessly with multiple wireless communication networks, using different wireless communication modes or wireless communication protocols. For example, user device 110 could be a dual-mode device capable of communicating with first wireless communication network 120 and second wireless communication network 130, or different elements thereof.

First wireless communication network 120 and second wireless communication network 130 each comprises communication and control systems for providing access to communication services for user devices over associated ones of wireless links 140-141. In some examples, first wireless communication network 120 and second wireless communication network 130 each include equipment to provide wireless access to communication services within different coverage areas to user devices, route communications between content providers and user devices, and receive and process registration and content requests, among other operations. First wireless communication network 120 and second wireless communication network 130 may also each comprise wireless access nodes, wireless access node controllers, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, switchover processors, or other communication and control equipment. In typical examples, first wireless communication network 120 and second wireless communication network 130 comprise different wireless technologies, such as different wireless protocols, wireless frequency spectrum, generations of wireless technology, or wireless communication modes. In some examples, first wireless communication network 120 comprises a third-generation (3G) wireless communication network, and second wireless communication network 130 comprises a fourth-generation (4G) wireless communication network.

Communication link 141 uses metal, glass, optical, air, space, or some other material as the transport media. Communication link 142 could use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 142 could be a direct link or may include intermediate networks, systems, or devices, and could include a logical network link transported over multiple physical links.

Wireless links 140-141 each use the air or space as the transport media. Wireless links 140-141 may each use various protocols, such as Code Division Multiple Access (CDMA), Code Division Multiple Access 2000 (CDMA-2000), Evolution-Data Optimized (EV-DO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although two main wireless links 140-141 are shown in FIG. 1, it should be understood that wireless links 140-141 are merely illustrative to show communication modes or wireless access pathways for user device 110. In other examples, further wireless links could be shown, with portions of the further wireless links shared and used for different communication sessions and associated overhead communications.

Communication links 140-142 may each include many different signals sharing the same associated link, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   exchanging first wireless communication signals with a user device over a first wireless communication network to provide a communication service, wherein the user device has a selection mode for a second wireless communication network that a user may set to one of: on, off, and automatic;
   wirelessly receiving a status signal from the user device over the first wireless communication network indicating if the network selection mode for the second wireless communication network is set to automatic;
   when the network selection mode in the user device is set to automatic, then processing location information for the user device to determine signal quality information for the second wireless communication network via measuring in the first wireless communication network a radio frequency (RF) signal quality for the second wireless communication network near to a geographic location of the user device, and determining potential service quality from the second wireless communication network for the user device based on at least the signal quality information and the geographic location of the user device; and
   when the potential service quality is higher than a threshold, then wirelessly transferring a control signal to the user device over the first wireless communication network, wherein the control signal drives the user device to automatically enable a wireless transceiver for the second wireless communication network; and
   exchanging second wireless communication signals with the user device over the second wireless communication network to provide the communication service.

2. The method of claim 1, wherein the first wireless communication network comprises a third-generation (3G) cellular voice and data network, and the second wireless communication network comprises a fourth-generation (4G) cellular voice and data network.

3. The method of claim 2, wherein the wireless transceiver for the second wireless communication network comprises a 4G transceiver, and wherein driving the user device to automatically enable the wireless transceiver for the second wireless communication network comprises instructing the user device to enable the 4G transceiver.

4. The method of claim 1, wherein wirelessly receiving the status signal from the user device over the first wireless communication network comprises receiving the status signal during handoff communications of the first wireless communication network from the user device.

5. The method of claim 1, wherein processing the location information comprises processing a database of estimated wireless coverage for the second wireless communication network with the geographic location for the user device.

6. The method of claim 1, wherein identifying the signal quality information for the second wireless communication network comprises determining the signal quality information based on service quality of other user devices communicating over the second wireless communication network proximate to the user device.

7. The method of claim 1, further comprising:
   in the second wireless communication network, identifying further signal quality information for the second wireless communication network and transferring the further signal quality information for delivery to the first wireless communication network, wherein the first wireless communication network processes the further signal quality information to determine the potential service quality for the user device.

8. The method of claim 1, wherein the control signal further drives the user device to exchange the second wireless communication signals with the second wireless communication network and disable a transceiver for the first wireless communication network.

9. A wireless communication system, comprising:
- a wireless access node of a first wireless communication network configured to exchange first wireless communication signals with a user device over a first wireless communication network to provide a communication service, wherein the user device has a selection mode for a second wireless communication network that a user may set to one of: on, off, and automatic;
- a switchover processor configured to receive a status signal transferred from the user device over the first wireless communication network indicating if the network selection mode for the second wireless communication network is set to automatic;
- when the network selection mode in the user device is set to automatic, then the switchover processor is configured to process location information for the user device to determine signal quality information for the second wireless communication network by measuring in the first wireless communication network a radio frequency (RF) signal quality for the second wireless communication network near to a geographic location of the user device, and determine potential service quality from the second wireless communication network for the user device based on at least the signal quality information and the geographic location of the user device; and
- when the potential service quality is higher than a threshold, then the switchover processor is configured to wirelessly transfer a control signal to the user device over the first wireless communication network, wherein the control signal drives the user device to automatically enable a wireless transceiver for the second wireless communication network; and
- a wireless access node of the second wireless communication network configured to exchange second wireless communication signals with the user device over the second wireless communication network to provide the communication service.

10. The wireless communication system of claim 9, wherein the first wireless communication network comprises a third-generation (3G) cellular voice and data network, and the second wireless communication network comprises a fourth-generation (4G) cellular voice and data network.

11. The wireless communication system of claim 10, wherein the wireless transceiver for the second wireless communication network comprises a 4G transceiver, and wherein the first wireless communication network is configured to instruct the user device to automatically enable the 4G transceiver.

12. The wireless communication system of claim 9, wherein the first wireless communication network is configured to receive the status signal during handoff communications of the first wireless communication network from the user device.

13. The wireless communication system of claim 9, wherein the first wireless communication network is configured to process a database of estimated wireless coverage for the second wireless communication network with the geographic location for the user device to process the location information.

14. The wireless communication system of claim 9, wherein the first wireless communication network is configured to identify the signal quality information for the second wireless communication network by determining the signal quality information based on service quality of other user devices communicating over the second wireless communication network proximate to the user device.

15. The wireless communication system of claim 9, comprising:
- the second wireless communication network configured to identify further signal quality information for the second wireless communication network and transfer the further signal quality information for delivery to the first wireless communication network, wherein the first wireless communication network processes the further signal quality information to determine the potential service quality for the user device.

16. The wireless communication system of claim 9, wherein the control signal further drives the user device to exchange the second wireless communication signals with the second wireless communication network and disable a transceiver for the first wireless communication network.

* * * * *